April 30, 1963 L. V. GEWISS 3,087,623
CHEVRON PLEATED FILTER SHEET CARTRIDGE FOR FLUIDS
Filed June 22, 1959 3 Sheets-Sheet 1
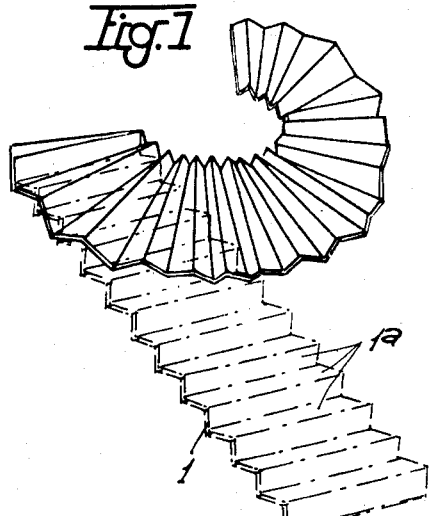
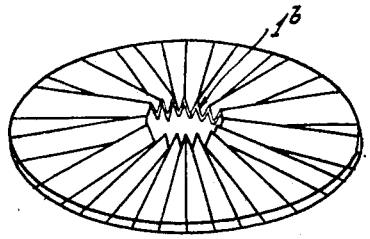
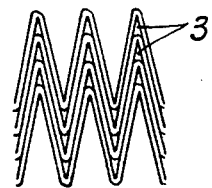
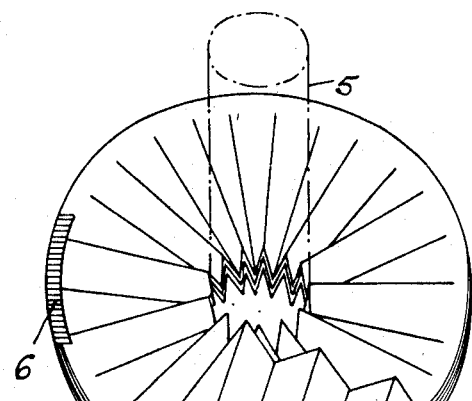
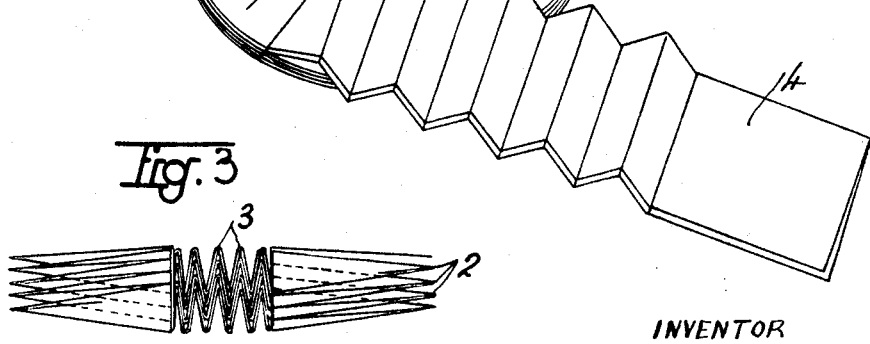
INVENTOR
LUCIEN VICTOR GEWISS
By Linton and Linton
ATTORNEYS

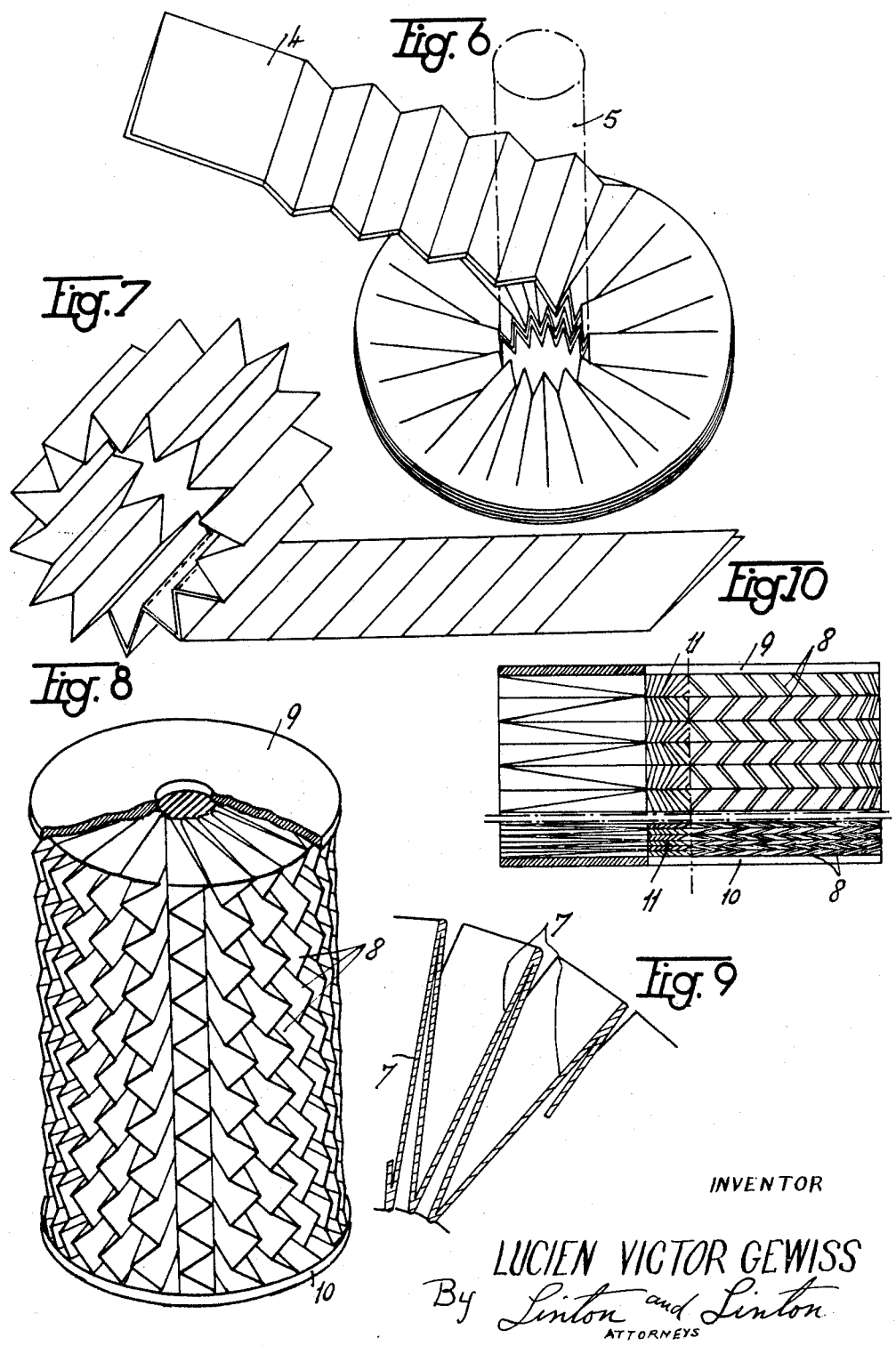

April 30, 1963  L. V. GEWISS  3,087,623
CHEVRON PLEATED FILTER SHEET CARTRIDGE FOR FLUIDS
Filed June 22, 1959  3 Sheets-Sheet 3

Inventor
LUCIEN VICTOR GEWISS
By Linton and Linton
Attorneys

United States Patent Office 3,087,623
Patented Apr. 30, 1963

1

3,087,623
CHEVRON PLEATED FILTER SHEET
CARTRIDGE FOR FLUIDS
Lucien Victor Gewiss, Ville d'Avray, France, assignor to
Marc Wood Societe Anonyme pour la Promotion des
Echanges Techniques Internationaux, Paris, France, a
company of France
Filed June 22, 1959, Ser. No. 821,768
Claims priority, application France Nov. 28, 1953
11 Claims. (Cl. 210—493)

The present invention relates to the making of pleated filter units from sheets of paper or fabric, for filtering liquids or gases.

The present application is a continuation-in-part of my copending application Serial No. 468,499, filed November 12, 1954, now Patent No. 2,897,971.

Filtering materials in the form of sheets are generally considered as the most suitable for a satisfactory filtration of liquids and gases.

The necessity of reducing the bulk of filtering apparatus made with such sheet material has led to various and numerous prior arrangements in which the sheet elements previously cut into shape are piled up or else in which one or more filtering sheets are folded in zig-zag formation, or again these two procedures are suitably combined.

Now, although it has been possible to obtain thus filtering areas of considerable capacity in filters of a small bulk, it has been found that various other conditions required for satisfactory filtration have been satisfied hitherto only in an imperfect manner, taking into account the varying or constant pressure to which the fluids to be filtered are submitted. These conditions are chiefly as follows:

Actual fluidtightness between the filtering sections;
Unvarying grade of filtering;
Stability of the transmitted volume of filtered fluid;
Lasting efficiency of the filtering system;
Provision of arrangements adapted to prevent the breaking under the action of pressure of certain sections of the filtering sheets;
A sufficient storage for the impurities retained in the filter, etc.

The present invention has for its object the provision of large area and small bulk filtering cartridges which satisfy the different abovementioned conditions. It covers also in addition to the actual filtering cartridges, various methods for producing these.

A filtering cartridge according to the present invention, includes chiefly a filtering sheet or a system of filtering sheets forming a continuous tubular generally cylindrical system the wall of which forms a plurality of superposed radial folds defining inside the cartridge an empty axial space, these folds being stacked in the area extending at the periphery of the empty space in a manner such as to produce in the corresponding area a greater density of filtering material than in all other points of the cartridge, the folds joining one another uninterruptedly and being urged into close relationship with the interposition between them of gaps which serve for the flow of liquid undergoing treatment, the two ends of the said tubular system being closed by fluidtight covers of which at least one is provided with a central opening communicating with the abovementioned empty axial space.

The cartridge of my invention thus constituted encloses an inner space extending throughout its height, surrounded by filtering material folded accordionwise and having no path of communication with the outside except through the central opening formed in one or possibly both of the fluidtight covers. This cartridge may be fitted in and secured to a filtering machine of any suit-

2 able type including a fluidtight tank and it is then sufficient to make the inner or the outer space defined by the cartridge inside the tank communicate with the fluid intake under pressure delivered to the apparatus, the other of these spaces being then connected with the fluid outlet so that the filtering may be operated correctly, since the fluid is forced to pass from one of said spaces into the other through the filtering material.

The advantages of the present invention and various embodiments thereof will be understood from the reading of the following description, reference being made to the accompanying drawings given by way of example and not in a limiting sense, and wherein:

FIG. 1 is a perspective view of a folded element adapted to form part of a filtering cartridge, in the course of production, with radial pleats extending in successive, transverse planes;

FIG. 2 is a perspective view of the same filtering element when finished;

FIG. 3 is an elevation with parts in section of a vertical half of a number of elements similar to that of FIG. 2, in stack formation, glued together along their periphery to constitute an assembly forming the cartridge;

FIG. 4 shows on a larger scale a fragment of the development of the wall of the axial recess formed at the center of the elements thus stacked of the embodiment of FIG. 3;

FIG. 5 is a perspective view of a further embodiment of a helicoidally wound cartridge, according to the present invention, in which the free edges of the strip are on the outer periphery;

FIG. 6 is a perspective view of a modification of the arrangement of FIG. 5 in which the free edges of the strip are on the inner chevrons;

FIG. 7 is a perspective view of a still further embodiment of a helicoidally wound cartridge in which the winding is in layers in a roll;

FIG. 8 is a perspective view of a modified form of filtering cartridge obtained through another method in which the chevrons are designed along lines parallel with the axis of the cartridge before the axial compression thereof, with a part of the cover removed;

FIG. 9 is a partial horizontal cross-section on a larger scale of the cartridge illustrated in FIG. 8;

FIG. 10 is a vertical, half-sectional axial and half-elevational view of the same cartridge of FIG. 9 partly before axial compression and partly after compression thereof;

Figure 11:
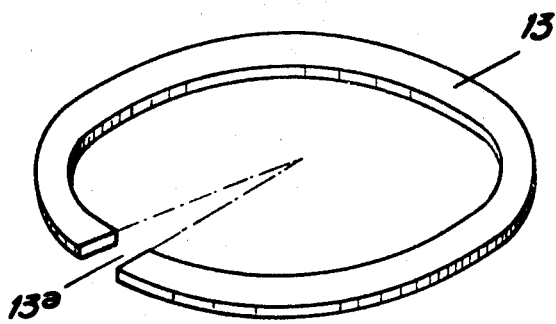
FIG. 11 shows a circular plane stay for use with the form of FIG. 2.

In the production of a filtering cartridge according to the present invention, I may operate, for instance, as follows, and as shown in FIG. 1:

Starting from a strip 1 of yielding, filtering material such as paper, fabric or the like, the breadth of which is equal to the difference between the outer diameter of the cartridge and the diameter of the axial space to be provided in the latter, while its length is equal to the circular perimeter of the cartridge, this strip is then folded lengthwise in two and pleated transversely so as to form a succession of pleats 1a which are all equal or which form equal pairs, the breadth of these pleats or pairs of pleats being equal to a submultiple of the length of the strip, as illustrated in dot-and-dash lines in FIG. 1. The strip as thus folded is then bent to form an annulus in its plane, the open longitudinal edges of the folded strip lying in this case on the outside of the annulus, and the cooperating ends of the annular double ply strip are then secured together, e.g. by gluing.

This produces a hollow, annular uninterrupted element shown in FIG. 2, the outer periphery of which forms approximately a lamina the diameter of which is equal to that of the cartridge, while its central portion defined by a line 1b is pleated in chevron shape, and its horizontal projection forms a circle of a diameter corresponding to that of the axial recess in the cartridge, the pleats extending radially from the inner periphery of the annular elements in fanwise formation.

A number of such identical annular elements 2, 2 are then stacked with the pleats of the successive elements engaging one another, as shown in FIG. 3, and they are secured flat over one another, as provided by a gluing of their adjacent free substantially unpleated outer edges. When the stacking has reached the height required for the complete cartridge, the latter is finished by securing a flat, circular annular cover of cardboard, metal, or the like suitable material, provided possibly with a central opening, over the unglued free outer edges of the lowermost element and of the uppermost element.

FIG. 4 shows how the pleats of filtering material sheets interengage along the periphery of the axial recess or opening of the cartridge and form engaging chevrons. It should be remarked that the angles at the apices of these chevrons are such that they form between the superposed pleats triangular spaces 3 which are open to the flow of fluid undergoing treatment. Whatever may be the magnitude of the pressure exerted on the pleats as a whole, these spaces 3 cannot be completely closed since the radii of curvature of the filtering material in the inner angles of the folds are of necessity smaller than those in the outer angles.

It should also be pointed out that, throughout the cartridge, the filtering surfaces face one another so that the pressure of the fluid to be filtered cannot have a detrimental action on them. When the fluid flows from the outside towards the inside of the cartridge, the fluid flows after filtration between the filtering sheets forming each annular element so as to reach the pleats and then the spaces 3 beyond which it enters the axial opening of the cartridge. The fluid progresses in the opposite direction when it flows from the inside to the outside of the cartridge.

The arrangements described ensure thus complete reliability both as concerns the grade of the filtering and the certainty that not even the smallest section of the surface of filtering sheets will break under the action of a continuous or momentary excess of pressure.

Experience shows that there is no particular difficulty in the making of an arrangement such as that which has just been described.

In a modified form, it is also possible to produce each of the annular laminar elements by bending the longitudinally folded and transversely pleated strip 1, obtained as described, in a manner such that its open longitudinal edges lie on the inside, i.e., along the periphery of the axial recess of the cartridge; in this case, the assembly of the stacked elements is then performed through a gluing of their inner free edges. In all cases, the above-described assembling may be constructed either through gluing or through clamping. When the annular elements are constructed as described with reference to FIGS. 1 and 2, it is possible, in fact, to do away with the successive connections thereof along their peripheries, and it is sufficient to hold them fast between the outer covers of the cartridge with the interposition between the successive elements of annular peripheral shims or stays made of cardboard or paper of a suitable thickness, which shims are cut at intervals so as to provide a passage for the fluid.

FIG. 11 shows a circular plane stay 13 provided with a gap 13a to permit the passage of fluid, and adapted to be inserted between the free edges of the annular layers of filtering material of the type shown in FIG. 2.

In FIG. 5 there is shown another modification of the manner of obtaining a cartridge, the appearance of which is quite similar to that of the previously described cartridge although its geometrical structure is somewhat different. According to this manner of operating, I start from a strip of filtering material 4, the breadth of which is equal as previously to the difference between the outer diameter of the cartridge and the diameter of the axial space to be formed in the latter, the length of this strip being, however, indefinite. After folding this strip lengthwise in two and having pleated it transversely in the manner disclosed hereinabove, I wind it in a continuous manner in successive turns or layers around a cylindrical mandrel 5, the free edges of the strip being arranged at the outer periphery of the wound strip. The central section is pleated to a maximum depth, while the free outer edges are relatively flattened. The breadth of the strip, the size of the folds, the diameter of the mandrel 5 and the outer diameter of the cartridge are selected in a manner such that the number of pleats in each convolution of the winding is an integer and consequently, the successive layers interengage in nested relation so as to form a kind of one-threaded helicoid surface.

During the winding procedure of FIG. 5, I resort to a suitable arrangement for compressing the strips and distributing adhesive material or staples onto the strips so as to secure in a continuous manner at 6 the lower free outer edge of one convolution of the strip section that is being wound to the upper free outer edge of the immediately preceding convolution. There is thus obtained a unit to the ends of which it is sufficient to secure the two terminal covers so as to obtain a cartridge of the same type as that described hereinabove with the difference that it has the shape of a one-thread helicoid.

I may also, in a modification of the method of FIG. 5, as illustrated in FIG. 6, wind an unlimited length of the strip 4 in a manner such that its free edges may be located on the inner side of the winding instead of on the outer periphery as in FIG. 5, the free edges of any two successive convolutions being adhesively secured to each other along the inner periphery of the cartridge. I obtain the same practical result of a helicoid in this case as in the precedingly disclosed arrangement of FIG. 5.

On the other hand, instead of starting from a strip folded lengthwise in two, as in FIG. 5, I may also start from a strip folded lengthwise into four, six, eight, or the like multiple of two, this strip being thenafter pleated and wound as previously. This would lead to helicoidal arrangements having 2, 3, 4 threads or more.

Instead of gluing or clamping together the free edges of the successive convolutions of the helicoidal strip as in FIG. 5, I may also insert simply between them interrupted inserts or shims or stays adapted to provide for fluidtightness when the whole arrangement is held fast between the two terminal covers.

Figure 12:
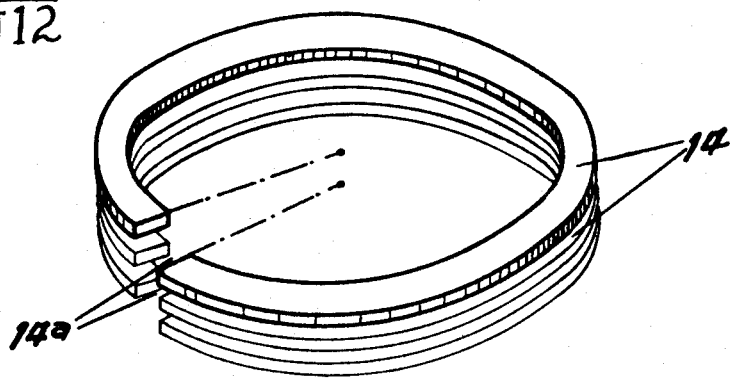
FIG. 12 shows a helicoidal stay to be inserted between the free edges of helicoidal wound strip layers of the modification of FIG. 5.

FIG. 12 shows a helicoidal stay adapted to be inserted between the free edges of the helicoidal wound strip layers of filtering material of a cartridge of the type shown in FIG. 5. This helicoidal stay is composed of a series of elementary stays 14 in the form of spirals which are arranged serially one after the other while providing between them gaps 14a.

FIG. 7 illustrates a further modified method which allows forming cartridge elements of a generally helicoidal structure of one of the two above disclosed types of FIGS. 5 and 6, while of a smaller height. According to this further method, instead of winding in flat, laminar formation, the strip 4 after folding and pleating same, I wind it in a roll over itself about an axis parallel to the plane of the strip so as to provide the first convolution with a number of pleats corresponding to the length of the perimeter of the cartridge (thirteen in the case of FIG. 7), and the outer free edge of each double convolution is then glued to the inner free edge of the following double convolution. As the winding continues with each chevron pleat engaging a chevron pleat in the preceding convolution, the inner pleats nearer the axis yield and gather to a greater extent under the pressure of the successive convolutions so as to leave room for the further plies wound on the outside of the first plies. It is necessary to stop the winding procedure before the central pleats are compressed to a too considerable extent, so as to allow the room required for the plies of the system to tilt and to give the convolutions of the winding a flat formation. This tilting movement is performed by urging towards the axis of the winding one of the pleated bases, either that which is glued or the other, which closes the pleating of this base while the other pleated base expands along the periphery of the cartridge. This produces a helicoidal type of structure.

In employing the method of FIG. 7, the superposition of a suitable number of such helicoidal elements which are then secured endwise together produces, after the ends of the unit obtained have been closed by covers, a cartridge of the same type as those illustrated in FIGS. 5 and 6.

The different types of cartridges which have been described are provided with pleats arranged radially fanwise and extending either in successive transverse cross-sectional planes as in the case of FIGS. 1 to 4, or else along helicoidal surfaces which are consequently oblique with reference to the axis of the cartridge as in the case of the embodiments illustrated in FIGS. 5 to 7. The chevron-shaped pleats forming the inner wall of the central opening in such cartridges in either of these cases are thus arranged along generally circular or helical lines, according to the case.

FIGS. 8 to 10 relate to another modified embodiment which allows obtaining a cartridge of the same type as the preceding cartridges of FIGS. 1–7 corresponding, however, to the limit case where the chevrons are aligned along lines parallel with the axis of the cartridge.

It is possible to produce such a cartridge, starting from a single sheet of filtering material of a generally rectangular shape and the size of which depends on the one hand on its actual thickness and on the other hand on the outer diameter and on the height of the cartridge to be obtained and also on the diameter of its axial opening. In producing such a cartridge by this method, the sheet is first folded longitudinally in a direction corresponding to the height of the cartridge to be produced so as to form major folds 7 (FIG. 9) which are all of equal size, their breadth being equal to the radial depth dimension of the cartridge, i.e., to the difference between its outer radius and the radius of the axial opening.

The folded sheet is then pleated in a direction perpendicular to the major folds 7 so as to produce small transverse pleats 8 (FIGS. 8 and 10) which are all similar, after which the terminal edges of the sheet are glued or otherwise secured together throughout the length of the cartridge blank, the corresponding pleats engaging each other on either side of the connecting line between these terminal edges. I then distribute or roll the vertical rows of pleats 7 as in a roll around the axis of the cartridge blank in a uniform star formation and secure to the ends of the blank the covers such as 9 and 10 so as to obtain the final cartridge illustrated in perspective view in FIG. 8. It is then sufficient to compress the cartridge axially so as to crush the vertically superposed pleats as clearly shown in the lower section of FIG. 10, this compression finishing the cartridge. FIG. 10 shows clearly the vertical arrangement assumed in this embodiment by the chevron-shaped pleats 11 along the inner periphery of the cartridge opening.

The above-described arrangement may obviously be constructed by using methods which are more or less different from those described hereinabove as to particular detail. For certain applications and chiefly when it is desired for the sake of fluidtightness to ensure an efficient clamping of the cartridge inside the filtering apparatus inside which it is fitted, it may be of interest to insert between its covers a perforated stay either inside the axial opening of the cartridge or over the outer periphery of the latter. In this case, the chevron-shaped pleats are no longer submitted directly to the clamping action exerted on the cartridge, and a certain freedom may be left to them, taking into account the value of the pressure exerted by the fluid to be filtered. The inner stay may, in the case of high pressures, serve also as a bearing for the inner ends of the chevron-shaped pleats since the spaces formed between the said chevron-shaped pleats provide for the volume of fluid transmitted.

It is also possible under the same conditions and in accordance with the procedure disclosed hereinabove to produce cartridges the outer and inner outlines of which are those of a polygon with sharp or rounded angles and having curvilinear or rectilinear sides.

It will be apparent to those skilled in the art that modifications may be made in the filtering units herein described to adapt the same to particular conditions, and all such modifications are comprised within the scope of the appended claims are considered to be comprehended within the spirit of my invention.

I claim:

1. A filtering cartridge for fluids constituted by at least one filtering sheet forming a tubular unit of a generally cylindrical shape, said tubular unit having a continuous wall which is formed by radial pleats superposed substantially in the direction of the geometrical axis of the cartridge and which defines inside the cartridge an empty axial space, said superposed pleats being stacked one on top of the other in nested relation substantially throughout the height of the cartridge and throughout the periphery of said axial space and being formed so as to obtain a greater density of filtering material along the periphery of said empty space than at any other point of the cartridge, each of said pleats being joined at one of its ends to the adjacent end of the next adjacent axially displaced pleat so as to form a V therewith, and means defining a fluid flow passage extending at least through one end of said cartridge, into said empty axial space and to said filtering sheet.

2. A filtering cartridge comprising a plurality of substantially identical annular-shaped layers of filtering material having a substantially V-shaped cross-section in a plane coincident with the axis of each annular layer, said V-shaped cross-section thus presenting in each layer two legs which join one another at one end and which have free edges at their other ends, said layers being formed with substantially equal radial pleats the depth of which decreases progressively from the inner periphery of each layer to its outer periphery so as to obtain a greater density of filtering material along the inner periphery of each layer than at its outer periphery, the radial pleats of each leg of each layer being nested in their opposite pleats in the other leg of said layer, said layers being superposed substantially in the direction of the geometrical axis of the cartridge with the radial pleats of the adjacent layers engaging one with another, means joining the lower free edge of each layer with the upper free edge of the following underlying layer throughout their perimeters so as to form a continuous annular wall, and means defining a fluid flow passage at least through one end of said cartridge.

3. A filtering cartridge comprising a helically wound strip of filtering material having a substantially V-shaped cross-section in a plane coincident with the axis of said helically wound strip, said V-shaped cross-section thus presenting in said strip two legs which join another at one end and which have free edges at their other ends, said strip being formed with substantially equal radial pleats the depth of which decreases progressively from the inner periphery to the outer periphery of the helicoidal formation so as to obtain a greater density of filtering material along the inner periphery of the helicoidal formation than at its outer periphery, the radial pleats of each leg of said strip being nested in their opposite pleats in the other leg of said strip, the convolutions of said strip being superposed substantially in the direction of the geometric axis of the cartridge with the radial pleats of the adjacent convolutions engaging one with another and so that the outer periphery of said convolutions defines a substantially cylindrical structure and the inner periphery of said convolutions defines a substantially cylindrical empty axial space, means joining the lower free edge of each convolution of said strip to the upper free edge of the underlying adjacent convolution throughout their perimeters so as to form a continuous annular wall, and means defining a fluid flow passage at least through one end of said cartridge.

4. A method for making a substantially cylindrical filtering cartridge having a substantially axially aligned opening, comprising the steps of taking a strip of filtering material, the breadth of which is approximately equal to the difference between the outer diameter of the cartridge and the diameter of its inner axial opening, folding said strip longitudinally in two, transversely pleating said strip to form a number of approximately equal pleats, winding said strip in a continuous manner around a winding axis so as to form said strip into a helicoidal configuration having an opening aligned along said winding axis, the pleats of each convolution nesting in the pleats in the following convolution, and joining the lower free edge of each convolution with the upper free edge of the underlying adjacent convolution throughout their perimeters so as to form a continuous annular wall.

5. A method as defined in claim 4 wherein said strip is wound around said winding axis with the plane of said strip being approximately normal to said axis during the winding operation.

6. A method as defined in claim 4 wherein said strip is wound around said winding axis with the plane of said strip being approximately parallel to said axis during the winding operation, and wherein, at a point in time after the strip has been wound around said axis, one of the edges of the resulting helicoid is urged towards the winding axis and the other of its edges urged away from the winding axis so as to align the plane of said strips normally to said winding axis.

7. A filtering cartridge for fluids comprising at least one filtering sheet forming a tubular unit of generally cylindrical shape, said tubular unit having a continuous wall which is formed by radially extending pleats superposed substantially in the direction of the geometrical axis of the cartridge and which defines inside the cartridge an empty axial space, said superposed pleats being stacked one on top of the other in nested relation and being formed so as to provide a greater density of filtering material along the periphery of said empty space than at any other point of the cartridge, each of said pleats being joined at one of its ends to the adjacent end of the next adjacent axially displaced pleat so as to form a V therewith.

8. A filtering cartridge comprising a plurality of annular layers of filtering material each having a substantially V-shaped cross-section in a plane coincident with the axis of said cartridge, said V-shaped cross-section thus presenting in each layer two layer segments which join one another at one end and which have free edges at their other ends, said layers being formed with radial pleats the depth of each of which decreases progressively from the inner periphery of each layer to its outer periphery so as to obtain a greater density of filtering material along the inner periphery of each layer than at its outer periphery, said layers being superposed substantially in the direction of the geometrical axis of the cartridge, and means joining the lower free edge of each layer with the upper free edge of the immediately underlying layer throughout their perimeters so as to form a continuous annular wall.

9. A filtering cartridge comprising a helically wound strip of filtering material having a substantially V-shaped cross-section in a plane coincident with the axis of said cartridge, said V-shaped cross-section thus presenting in said strip two strip segments which join one another at one end and which have free edges at their other ends, said strip being formed with radial pleats the depth of each of which decreases progressively from the inner periphery to the outer periphery of the helicoidal formation so as to obtain a greater density of filtering material along the inner periphery of the helicoidal formation than at its outer periphery, the convolutions of said strip being superposed substantially in the direction of the geometrical axis of the cartridge, and means joining the lower free edge of each convolution of said strip to the upper free edge of the immediately underlying convolution throughout their perimeters so as to form a continuous annular wall.

10. A method of making a substantially cylindrical filtering cartridge having a substantially axially aligned opening comprising the steps of providing a plurality of sheets of filter material, folding each of said sheets longitudinally, transversely pleating said longitudinally folded sheets into a plurality of approximately equal pleats, forming each of said folded and pleated sheets into an annulus with the plane of each of said sheets coinciding with the plane of each of said annuli, stacking said annuli in superposed nested relation relative to one another, and joining the lower free edge of each annulus with the upper free edge of the underlying adjacent annulus throughout their perimeters so as to form a continuous annular wall.

11. A method of making a substantially cylindrical filtering cartridge having a substantially axially aligned opening comprising the steps of providing a plurality of layers of filter material each of which layers is substantially in the form of an annulus and is comprised of two superposed filter portions each having pleats in nesting relation to the pleats of the other, said pleats being radially directed with respect to the axis of said annulus, one of the edges of one of said portions being attached to the super-adjacent edge of the other of said portions throughout its length, stacking said layers on top of one another in nested relation and substantially in the direction of the geometrical axis of the cylinder of said cartridge, and joining the lower free edge of each layer with the upper free edge of the underlying adjacent layer throughout their peripheries so as to form a continuous annular wall.

References Cited in the file of this patent

UNITED STATES PATENTS

| | | |
|---|---|---|
| 2,190,014 | Colas | Feb. 13, 1940 |
| 2,298,980 | Sloan | Oct. 13, 1942 |
| 2,372,865 | Taylor | Apr. 3, 1945 |
| 2,421,704 | Kasten | June 3, 1947 |

FOREIGN PATENTS

| | | |
|---|---|---|
| 437,614 | France | Feb. 23, 1912 |
| 16,250 | France | Dec. 10, 1912 |
| | (Addition to No. 437,614) | |
| 987,457 | France | Apr. 18, 1951 |
| 1,010,267 | France | Mar. 19, 1952 |